United States Patent
Yao et al.

(10) Patent No.: US 8,503,139 B2
(45) Date of Patent: Aug. 6, 2013

(54) HIGH DIMMING RATIO CONTROL AND SHORT CIRCUIT PROTECTION FOR LED DRIVE WITH STEP UP CONVERTER

(75) Inventors: Kaiwei Yao, San Jose, CA (US); Zheng Luo, Santa Clara, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 605 days.

(21) Appl. No.: 12/701,416

(22) Filed: Feb. 5, 2010

(65) Prior Publication Data
US 2011/0194214 A1    Aug. 11, 2011

(51) Int. Cl.
*H02H 9/00*    (2006.01)
*H02M 3/335*   (2006.01)

(52) U.S. Cl.
USPC .............................................. 361/18; 363/17

(58) Field of Classification Search
USPC .............................................. 361/18; 363/17
See application file for complete search history.

(56) References Cited

U.S. PATENT DOCUMENTS

| | | | |
|---|---|---|---|
| 6,026,006 A * | 2/2000 | Jiang et al. | 363/132 |
| 6,798,674 B2 * | 9/2004 | Kwon | 363/39 |
| 7,411,797 B2 * | 8/2008 | Norrga et al. | 363/17 |
| 7,994,657 B2 * | 8/2011 | Kimball et al. | 307/82 |
| 2004/0165408 A1 * | 8/2004 | West et al. | 363/131 |
| 2006/0048983 A1 * | 3/2006 | Urakabe et al. | 180/65.3 |
| 2007/0190369 A1 * | 8/2007 | Leach et al. | 429/9 |
| 2007/0236965 A1 * | 10/2007 | Chen et al. | 363/17 |
| 2008/0001547 A1 * | 1/2008 | Negru | 315/189 |

* cited by examiner

*Primary Examiner* — Scott Bauer
(74) *Attorney, Agent, or Firm* — Perkins Coie LLP

(57) ABSTRACT

The present invention discloses a step up circuit with output floating for driving a load such as a LED or a series of LEDs in a string. The step up circuit comprises an input port, an output port, an inductor, an input capacitor, an output capacitor, a first switch, a second switch and a third switch. The third switch S3 is an additional switch for purpose of high dimming ratio control, short circuit protection and input disconnection realization. Further, the third switch can implement an additional LDO function when the voltage at the input port is larger than the voltage across the load.

26 Claims, 2 Drawing Sheets

HIGH DIMMING RATIO CONTROL AND SHORT CIRCUIT PROTECTION FOR LED DRIVE WITH STEP UP CONVERTER

TECHNICAL FIELD

A circuit and method for light source driving, and in particular, to a circuit and method for LED driving to achieve high dimming ratio control, short circuit protection and input disconnection with step up topology.

BACKGROUND

Light Emitting Diodes (LEDs) are gaining great popularity as light sources in various electrical applications. In many applications, LED lighting with a high dimming ratio is required, such as for realizing a high contrast display. Short circuit protection is also required for safety and reliability. In most battery powered devices, the battery is desired to be disconnected from the power input ports of the device when the system is off to prevent power leakage, i.e. complete input disconnection is required. In the prior art, a buck or boost type DC-DC converter may usually be used as a LED driving circuit. When conventional step up converter is used, at least two additional switches are needed to realize high dimming ratio control, short circuit protection, and input disconnection separately.

FIG. 1(a) shows one prior art solution to realize high dimming ratio control, short circuit protection, and input disconnection functions when a conventional boost converter is used to drive LEDs. Two additional switches S3 and S4 are inserted to the conventional boost converter topology. One end of the switch S3 is coupled to the anode of the series LEDs, and an opposite end of the switch S3 is coupled to ground. The switch S4 is connected in series with the boost converter rectifier switch S2. One skilled in the art will understand that the rectifier switch S2 can also be replaced by a diode D1. In normal operation, the boost converter power switch S1 and rectifier switch S2 are turned on complimentarily, both the additional switches S3 and S4 are in continuous conduction. When dimming, a dimming signal is provided to control the switch S3. When the dimming signal is on, the switch S3 is turned on so that power is delivered from a power supply Vin to the LED load. When the dimming signal is off, the switch S3 is turned off and thus the current flowing through the LEDs is cut off immediately. Meanwhile, the voltage across the output capacitor Co is maintained since there exists no discharge path when the switch S3 is off. Because the capacitor Co voltage is held during the dimming off period, when the dimming signal is on again, the current through the LEDs can resume to a regulated level quickly.

Therefore, with the addition of the switch S3, the current driving the LEDs can be controlled to be a square waveform, whose average value is proportional to the duty of the dimming signal even when the dimming duty is very small. In other words, high dimming ratio can be achieved. When short circuit or over current conditions are detected at the output of the converter, for example the output current is detected to have reached a protection threshold, the switch S4 is turned off to protect both the load and the converter from being damaged by such failure. It should be noted that the switch S4 needs to be turned off slowly to avoid causing large voltage spikes, since there is no current path available during protection. When the power supply Vin is desired to be purely disconnected from the LED driving circuit, both the boost converter power switch S1 and the additional switch S4 are turned off slowly in order to avoid large voltage spikes.

Referring now to FIG. 1(b), another prior art solution to implementing high dimming ratio control, short circuit protection, and input disconnection realization is illustrated. Two additional switches S5 and S6 are inserted to a conventional boost converter topology. One end of the switch S5 is coupled to the anode of the series LEDs, and an opposite end of the switch S5 is coupled to ground. The switch S6 is connected between a power supply Vin and an input terminal of the conventional boost converter. In normal operation, the boost converter power switch S1 and rectifier switch S2 are turned on complimentarily, both the additional switches S5 and S6 are in continuous conduction. When dimming, the switch S5 is controlled to be turned on/off by a dimming signal, and the working principle is the same as that of the switch S3 in FIG. 1(a) to realize high dimming ratio control. For short circuit and over current protection, the switch S6 is turned off to cut the power supply Vin from delivering power to the LEDs load. Further complete disconnection of the power supply Vin from the boost converter circuit is achieved to prevent power leakage. However it should be noted that the switch S6 needs to be turned off slowly to avoid large voltage spikes. Otherwise, it is necessary to add a freewheeling diode D2 to create a current path, with an anode of the diode D2 coupled to a common node of the switch S6 and the inductor L1 and a cathode of the diode D2 coupled to ground.

For both the aforementioned solutions of FIG. 1(a) and FIG. 1(b), the additional switches S3 and S4 or S5 and S6 are always on during normal operation, thus extra conduction loss is introduced. Further, when dimming, the additional switches S3 and S5 are on when the dimming signal is on, resulting in extra conduction loss as well. Moreover, when realizing short circuit protection and input disconnection functions, the switches S4 and S6 should be turned off slowly, which needs corresponding control circuitry and thus increases the system complexity. Otherwise, for the solution shown in FIG. 1(b), an additional freewheeling diode is needed, which introduces more cost. In brief, the additional switches used for achieving high dimming ratio control, short circuit protection and input disconnection increase the conduction loss of the system and the additional switches introduce more cost and system complexity.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein:

FIG. 1 (b) shows a schematic diagram of a second prior art LED driving circuit based on a conventional boost converter;

DETAILED DESCRIPTION

Various embodiments of the invention will now be described. In the following description, some specific details, such as example circuits and example values for these circuit components, are included to provide a thorough understanding of embodiments of the invention. One skilled in the relevant art will recognize, however, that the invention can be practiced without one or more specific details, or with other methods, components, materials, etc. In other instances, well-known structures, materials, or operations are not shown or described in detail to avoid obscuring aspects of the invention.

Figure 2:
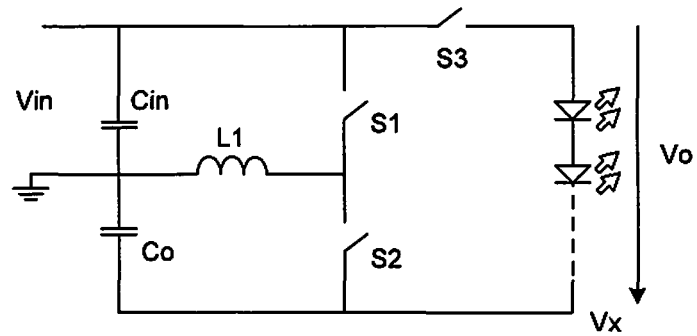
FIG. 2 shows a step up circuit with output floating in accordance with one embodiment of the present invention.

FIG. 2 shows a step up circuit with a floating output in accordance with one embodiment of the present invention. The step up circuit comprises an input port, an output port, an inductor L1, an input capacitor Cin, an output capacitor Co, a first switch S1 and a second switch S2. The step up circuit further comprises a third switch S3, wherein third switch S3 is an additional switch for the purpose of high dimming ratio control, short circuit protection and input disconnection realization. The input port is electrically coupled to receive a power input Vin; the output port is electrically coupled to provide an output signal; the input capacitor Cin is coupled between the input port and ground; the first switch S1 is coupled to the input port at one terminal and coupled to ground via the inductor L1 at the other terminal; the inductor L1 is coupled between the other terminal of the first switch S1 and ground; the second switch S2 is coupled between the other terminal of the first switch S1 and the output port; the output capacitor Co is electrically coupled between the output port and ground; and the third switch S3 is electrically coupled to the input port at one terminal and coupled to the output port via a load at the other terminal. The load may be any DC driven light source, such as an LED or a series of LEDs in a string.

During normal operation, the third switch S3 is always on and the first switch S1 and the second switch S2 are turned on or off complementarily. For one switching cycle Ts, during a period DTs, wherein D is the duty ratio whose value lies between [0, 1], the first switch S1 is on and the second switch S2 is off, the inductor L1 is charged by the power supply Vin. The voltage across the inductor L1 is Vin. During the rest period (1−D)Ts of the switching cycle Ts, the first switch S1 is off, the second switch S2 is on, the inductor L1 current is discharged. The voltage across the inductor L1 is Vx, which possesses a negative value. In steady-state operation, the voltage-second across the inductor is balanced. According to this:

$$Vin*DTs=-Vx*(1-D)Ts \quad (e1)$$

In the context of the present description, the output voltage Vo of the proposed step up circuit is defined as the voltage dropped across the load, thus the output voltage Vo is expressed as follows:

$$Vo=Vin-Vx \quad (e2)$$

It results from the above two equations (e1) and (e2) that the voltage gain of the proposed step up circuit is as follows:

$$Vo/Vin=1/(1-D) \quad (e3)$$

It can be concluded from the equation (e3) that the voltage gain of the proposed step up circuit is the same as that of the conventional boost converter. Therefore, in normal operation, the proposed step up circuit realizes the same step up function as the conventional boost converter does.

When dimming is desired for the LED load, the third switch S3 is controlled by a dimming signal that turns on/off to regulate the average power delivered from the power supply Vin to the LED load. When the dimming signal is on, the third switch S3 is turned on, the first switch S1 and the second switch S2 operate as in normal operation, and power is delivered to the LED load. When the dimming signal is off, the third switch S3 is turned off, so that the current flowing through the LEDs load is cut off immediately. The first switch S1 and the second switch S2 are also turned off for power saving. During this dimming off period, since there is no discharge path for the capacitor Cin and the capacitor Co, the capacitor Cin voltage and the capacitor Co voltage are maintained. Therefore, when the dimming signal is on again, the current through the LEDs can resume to a regulated level quickly. Thus, with the additional switch S3, the current driving the LEDs can be controlled to be a square waveform, whose average value is proportional to the duty of the dimming signal even when the dimming duty is very small. In other words, high dimming ratio is achieved.

When the system is turned off and complete disconnection of the step up circuit and the load from the power supply Vin is desired, both the first switch S1 and the third switch S3 are turned off. In this case, the power supply Vin is disconnected from the step up circuit and the load. The second switch S2 is in a status that allows the inductor L1 current being discharged through a loop formed by the inductor L1, the switch S2 and the output capacitor Co, so that no large voltage spike occurs. Thus the second switch S2 is on if it is implemented by a diode or any other switching device, or else the second switch S2 can be off if it is implemented by a switching device with a body diode, letting the body diode on.

When short circuit or over current conditions occur, the proposed step up circuit can provide good protection to both the step up circuit and the load from being damaged by such failure. In the case that all the LEDs are shorted, or the anode of one or more of the LEDs is shorted to ground, the third switch S3 is turned off to realize short circuit protection for both the load and the step up circuit. At the same time, the first switch S1 is turned off so that no more power is delivered from the power supply Vin to the circuit. In this case, the second switch S2 is on or if said second switch S2 has a body diode, it can be off with its body diode on in order to create a discharge path for the inductor L1 current, so that no large voltage spikes occur. In the case that the cathode of one or more of the LEDs is shorted to ground, the first switch S1 and the third switch S3 are turned off so that no more power is delivered from the power supply Vin. The second switch S2 should be turned on or if it possesses a body diode, it remains off with its body diode on so that the inductor L1 current can be discharged to avoid large voltage spikes.

According to one embodiment of the present invention, the third switch S3 can be easily implemented by a P channel MOSFET.

Figure 3:
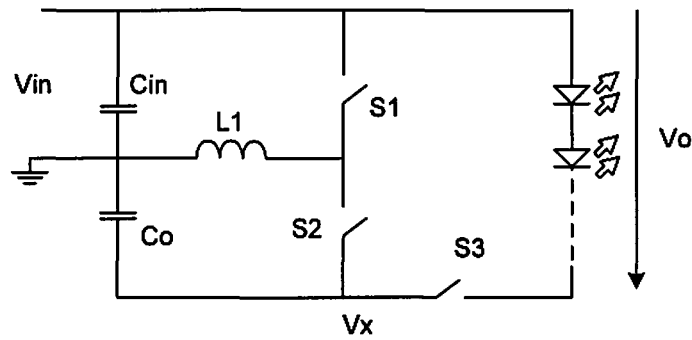
FIG. 3 shows a step up circuit with output floating in accordance with another embodiment of the present invention.

In another embodiment of the present invention, the third switch S3 is electrically coupled to the output port at one terminal and coupled to the input port via a load at the other terminal as shown in FIG. 3. For this configuration, an N channel MOSFET can be used to implement the third switch S3.

Figure 4:
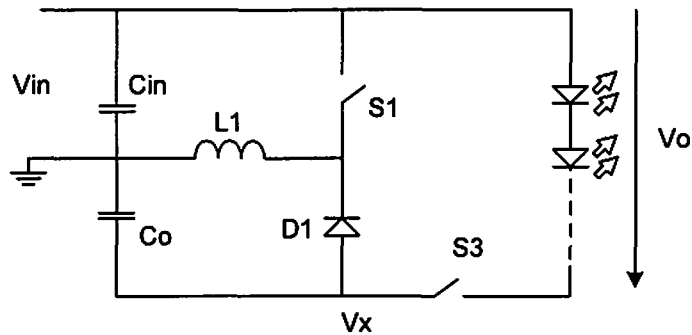
FIG. 4 illustrates a step up circuit with output floating in accordance with still another embodiment of the present invention.

In various embodiments of the present invention, the second switch S2 can be a diode or a synchronous rectifier switch. Illustrated in FIG. 4 is a step up circuit with a diode D1 used to replace the second switch S2 according to still another embodiment of the present invention. The working principle of the circuit shown in FIG. 4 is the same as that of the circuit shown in FIG. 2.

Figure 1A:
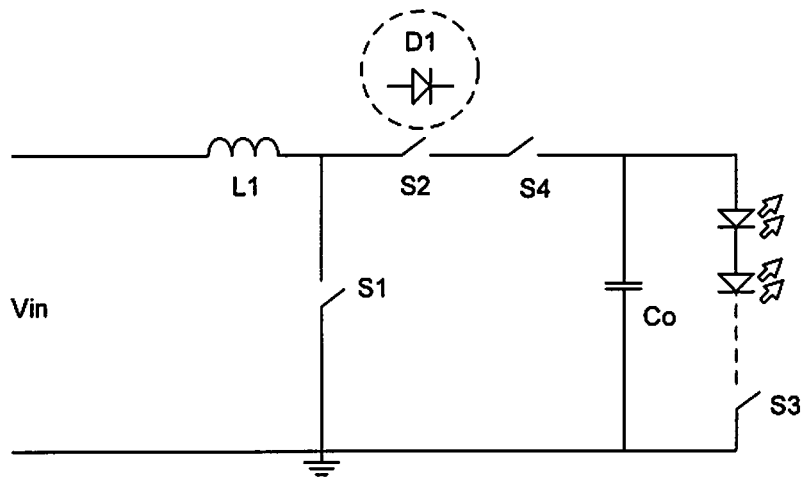
FIG. 1 (a) shows a schematic diagram of a first prior art LED driving circuit based on a conventional boost converter.
Figure 1B:
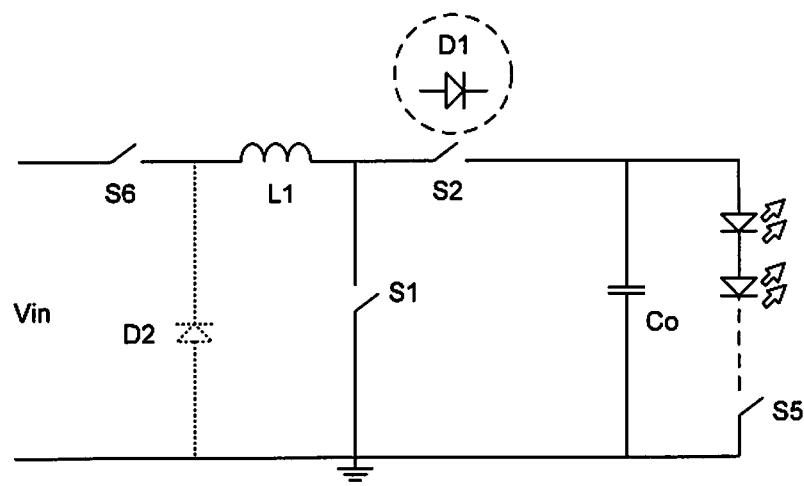

In comparison with the prior art solutions for high dimming ratio control, short circuit protection and input disconnection when driving LEDs load based on a conventional boost converter as illustrated in FIG. 1(a) and FIG. 1(b), the step up circuits taught in the present disclosure achieve high dimming ratio control, short circuit protection and input disconnection functions with only one additional switch used.

Thus the step up circuits disclosed herein greatly reduce the conduction loss as well as the complexity of the system and they are cost saving.

One more benefit of the step up circuits proposed herein is that an additional LDO function can be achieved when the power supply Vin voltage is larger than the output voltage Vo, with the third switch S3 operating in linear-active region.

The above detailed description of the embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize.

For instance, while specific component values and voltage values are provided herein, it is to be appreciated that these values are for the sake of illustration and explanation. Various embodiments of the invention may utilize values that are different from what is specified herein.

These modifications can be made to the invention in light of the above detailed description. The terms used in the following claims should not be construed to limit the invention to the specific embodiments disclosed in the specification and claims. Rather, the scope of the invention is to be determined entirely by the following claims, which are to be construed in accordance with established doctrines of claim interpretation.

We claim:

1. A step up circuit, comprising:
an input port for receiving an input signal;
an output port for providing an output signal that drives a load;
a first capacitor, electrically coupled between the input port and ground;
an inductor connected to ground;
a first switch coupled to the input port at one terminal and coupled to ground via the inductor at the other terminal;
a second switch, electrically coupled between the other terminal of the first switch and the output port;
a third switch, electrically coupled to the input port at one terminal and coupled to the output port via a load at the other terminal; and
a second capacitor, electrically coupled between the output port and ground.

2. The step up circuit as described in claim 1, wherein said second switch can be a diode or a synchronous rectifier switch.

3. The step up circuit as described in claim 1, wherein said third switch can be an N channel MOSFET.

4. The step up circuit as described in claim 1, wherein said load is a DC driven light source, such as a LED or a series of LEDs in a string.

5. The step up circuit as described in claim 1, wherein during normal operation, said first switch and second switch are turned on complementarily, and said third switch is on continuously.

6. The step up circuit as described in claim 1, wherein during a dimming on period, said first switch and second switch are turned on complementarily, and said third switch is on continuously, further wherein during a dimming off period, said first switch, second switch and third switch are turned, off.

7. The step up circuit as described in claim 1, wherein when short circuit protection or purely disconnection of said input signal from the step up circuit is required, said first switch and third switch are turned off, said second switch is in a status that creates a discharge path for the current flowing through said inductor.

8. The step up circuit as described in claim 1, wherein said third switch operates in linear-active region when the voltage at the input port is larger than the voltage across the load.

9. A step up circuit, comprising:
an input port for receiving an input signal;
an output port for providing an output signal;
a first capacitor coupled between the input port and ground;
an inductor connected to ground;
a first switch coupled to the input port at one terminal and coupled to ground via the inductor at the other terminal;
a second switch, electrically coupled between the other terminal of the first switch and the output port;
a third switch, electrically coupled to the output port at one terminal and coupled to the input port through a load at the other terminal; and
a second capacitor coupled between the output port and ground.

10. The step up circuit as described in claim 9, wherein said second switch can be a diode or a synchronous rectifier switch.

11. The step up circuit as described in claim 9, wherein said third switch can be a P channel MOSFET.

12. The step up circuit as described in claim 9, wherein said load is a DC driven light source, such as a LED or a series of LEDs in a string.

13. The step up circuit as described in claim 9, wherein during normal operation, said first switch and second switch are turned on complementarily, and said third switch is on continuously.

14. The step up circuit as described in claim 9, wherein during a dimming on period, said first switch and second switch are turned on complementarily, said third switch is on continuously, and further wherein during a dimming off period, said first switch, second switch and third switch are turned off.

15. The step up circuit as described in claim 9, wherein when short circuit protection or disconnection of said input signal from the step up circuit is required, said first switch and third switch are turned off, said second switch is in a status that creates a discharge path for the current flowing through said inductor.

16. The step up circuit as described in claim 9, wherein said third switch operates in linear-active region when the voltage at the input port is larger than the voltage across the load.

17. A method, comprising:
providing a step up topology with floating output, wherein said step up topology comprises:
an input port for receiving an input signal;
an output port for providing an output signal;
a first capacitor coupled between the input port and ground;
an inductor coupled to ground;
a first switch coupled to the input port at one terminal and coupled to ground via an inductor at the other terminal;
a second switch coupled between the other terminal of the first switch and the output port; and
a second capacitor coupled between the output port and ground;
driving a load with said step up topology with said load coupled between the input port and the output port; and
adding a third switch in said step up topology to realize high dimming ratio control, short circuit protection and input disconnection.

18. The method as described in claim 17, wherein said third switch is added such that said third switch is coupled to the input port at one terminal and coupled to an end of said load at the other terminal; an opposite end of said load is coupled to the output port.

19. The method as described in claim 17, wherein said third switch is added such that said third switch is coupled to the output port at one terminal and coupled to an end of said load at the other terminal; an opposite end of said load is coupled to the input port.

20. The method as described in claim 17, wherein during normal operation, said first switch and second switch are turned on complementarily, and said third switch is on continuously.

21. The method as described in claim 17, wherein during a dimming on period, said first switch and second switch are turned on complementarily, said third switch is on continuously, further wherein during a dimming off period, said first switch, second switch and third switch are turned off.

22. The method as described in claim 17, wherein when short circuit protection or purely disconnection of said input signal from the step up circuit is required, said first switch and third switch are turned off, said second switch is in a status that creates a discharge path for the current flowing through said inductor.

23. The method as described in claim 17, wherein said second switch can be a diode or a synchronous rectifier switch.

24. The method as described in claim 17, wherein said third switch operates in linear-active region when the voltage at the input port is larger than the voltage across the load.

25. The method as described in claim 18, wherein said third switch can be an N channel MOSFET.

26. The method as described in claim 19, wherein said third switch can be a P channel MOSFET.

* * * * *